(12) United States Patent
Noller et al.

(10) Patent No.: US 8,657,947 B2
(45) Date of Patent: *Feb. 25, 2014

(54) SILYLATED AMINO RESINS

(75) Inventors: Bastian Noller, Lorsch (DE); Reinhold Schwalm, Wachenheim (DE); Christine Roesch, Mainz (DE); Thomas Breiner, Laudenbach (DE); Jean-Francois Stumbe, Strassbourg (FR); Christina Haaf, Hemsbach (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,091

(22) Filed: Sep. 10, 2012

(65) Prior Publication Data

US 2013/0000516 A1    Jan. 3, 2013

Related U.S. Application Data

(62) Division of application No. 13/027,696, filed on Feb. 15, 2011, now Pat. No. 8,309,649.

(60) Provisional application No. 61/304,816, filed on Feb. 16, 2010.

(51) Int. Cl.
| | |
|---|---|
| *D06M 15/643* | (2006.01) |
| *B32B 17/06* | (2006.01) |
| *B32B 9/00* | (2006.01) |
| *B32B 9/04* | (2006.01) |
| *C08L 83/00* | (2006.01) |
| *C08L 83/04* | (2006.01) |

(52) U.S. Cl.
USPC ........ 106/287.11; 428/429; 428/447; 442/59; 524/516; 524/547; 524/588; 525/473; 544/196; 544/197; 544/198; 544/206; 544/207

(58) Field of Classification Search
USPC .................. 106/287.11; 427/372.2, 384, 402; 428/447, 429; 442/59; 524/588, 516, 524/547; 544/196, 197, 198, 206, 207; 525/473

See application file for complete search history.

(56) References Cited

U.S. PATENT DOCUMENTS

| | | | |
|---|---|---|---|
| 4,280,938 A | 7/1981 | Strazik et al. | |
| 4,281,091 A | 7/1981 | Strazik et al. | |
| 7,186,772 B2 | 3/2007 | Berkau et al. | |
| 2004/0214017 A1 | 10/2004 | Uhlianuk et al. | |
| 2009/0012256 A1 | 1/2009 | Omi et al. | |
| 2011/0230586 A1 | 9/2011 | Schwalm et al. | |
| 2013/0005204 A1* | 1/2013 | Noller et al. | 442/59 |

FOREIGN PATENT DOCUMENTS

| | | |
|---|---|---|
| EP | 1 473 320 A2 | 11/2004 |
| EP | 1 473 320 A3 | 11/2004 |
| EP | 1 784 466 | 5/2007 |
| WO | WO 2006/026669 A2 | 3/2006 |
| WO | WO 2011/015539 A1 | 2/2011 |

OTHER PUBLICATIONS

International Search Report issued Jun. 21, 2011, in Patent Application No. PCT/EP2011/052094 (with English Translation of Category of Cited Documents).

Progress in Organic Coatings, 20 (1992) 81-96, Takao Hirayama and Marek W. Urban, Department of polymers and Coatings, North Dakota State University, Fargo ND 58105 (USA).

V.P. Pavlyuchenko, S.S. Ivanchev, M. Ratzsch, H. Bucka, O.N. Primachenko, P. Leitner, S.Ya. Khalkin, (Transetherifiation of Melamine-Formalydehyde Resin Methyl Ethers and Competing Reaction of Self-Condensation, Journal of Applied Polymer Science, vol. 101, 2977-2985, 2006.

M.G. Voronkov, N. N. Vlasova, S.V. Kirpichenko, S.A. Vol'shakova, V.V. Keiko, E.O. Tsetlina, S. V. Amosova, B.A. Trofimov and V. Khvalovskii, Reaction of ethyl vinyl sulfide and divinyl sulfide with triethyl- and triethoxysilane, Organic Chemistry, Russian Chemical Bulletin, vol. 28, No. 2, 389-393, 1979.

* cited by examiner

*Primary Examiner* — Bijan Ahvazi
(74) *Attorney, Agent, or Firm* — Oblon, Spivak, McClelland, Maier & Neustadt, L.L.P.

(57) ABSTRACT

The present invention relates to silylated amino resins, to processes for preparing them, to their use, and to coating compositions comprising them.

10 Claims, No Drawings

SILYLATED AMINO RESINS

This application is a divisional application of U.S. Ser. No. 13/027,696 filed on Feb. 15, 2011.

The present invention relates to silylated amino resins, to processes for preparing them, to their use, and to coating compositions comprising them.

Pigmented paints and transparent coating materials comprising or based on amino resins have been known for a number of decades.

Römpp's Chemielexikon describes amino resins as "usually relatively low molecular mass polycondensation products formed from carbonyl compounds (especially formaldehyde, more recently also higher aldehydes and ketones), nucleophilic components (all H-acidic compounds which have an unattached electron pair at the condensation site), and compounds containing NH groups, such as, for example, urea (urea resins), melamine (melamine resins, e.g., melamine-formaldehyde resins), urethanes (urethane resins), cyanamide and dicyanamide (cyanamide resins and dicyanamide resins), aromatic amines (aniline resins), and sulfonamides (sulfonamide resins), which are linked with one another in a condensation reaction".

Among the amino resins, melamine-formaldehyde resins in particular are widespread on account of their beneficial properties in coating compositions.

Unplasticized melamine-formaldehyde resins serve, either alone or in combination with further, chemically different crosslinkers, examples being blocked polyisocyanates, tris-alkylcarbamoyltriazines (TACT) or epoxides, as a crosslinking component in binder mixtures. After the film-forming constituents have cured, a coating is obtained which is resistant to chemical, mechanical, and weathering-related influences. Plasticized melamine-formaldehyde resins may exhibit modifications with carbamate structures, blends with polyesters or alkyd resins, or precondensations therewith. If used on flexible coating substrates which lack dimensional stability, unplasticized melamine-formaldehyde resins require external elastilization so that the coating does not rupture; as a sole formulating ingredient, the crosslinkers form only brittle networks.

Melamine-formaldehyde resins can be characterized according to fields of application (molding compounds, glues, impregnating resins, coating materials), alkylating compounds (etherification with butanol, methanol, mixed etherification) or, as listed here, according to the ratio of triazine to formaldehyde to etherifying alcohol:
1. completely to highly methylated and fully alkylated to highly alkylated resins (HMMM grades)
2.1 partly methylated and highly alkylated resins (high imino grades)
2.2. partly methylated and partly alkylated resins (methylol grades)
3. resins with a low degree of methylation (melamine-formaldehyde condensates)

The first major group, that of the fully etherified melamine-formaldehyde resins, in which the molar melamine:formaldehyde:alcohol incorporation ratio is theoretically 1:6:6, in practice generally 1:>5.5:>5.0, and usually 1:>5.5:>4.5, is distinguished by extremely good high-solids behavior (relatively low viscosity at high solids content). In this group of crosslinkers, the free formaldehyde is readily reducible, owing to the low viscosity of the amino resin. At the present time it is possible to achieve a free formaldehyde content <0.3% by weight. The commercial products usually comprise methanol as the alcohol, although grades with mixed etherification, or fully butylated grades, are also known.

The fully etherified melamine-formaldehyde resins are employed in practice preferably in can coatings and coil coatings worldwide, and in NAFTA also for all coats of the automotive coat system.

The low thermal reactivity under baking conditions, such as 20 minutes at 140° C., necessitates catalysis with strong acids for these fully etherified melamine-formaldehyde resins. This results in very rapid curing, and a homogeneous co-network as a result of transetherification with the binder, accompanied by the release of the etherifying alcohols. With this strong-acid catalysis, very short cure times are possible, as with partly methylated melamine-formaldehyde resins. Crosslinking may be accompanied by formaldehyde emission which goes well beyond the free formaldehyde and is due to the re-splitting of methylol groups.

The second major group, that of the partly etherified melamine-formaldehyde resins, which in practice usually have a molar melamine:formaldehyde:alcohol incorporation ratio of 1:3 to 5.4:2 to 4.3, is distinguished by a much higher thermal reactivity than that of the first group, without acid catalysis. The production of these crosslinkers is accompanied by self-condensation, which leads to a higher viscosity (lower high-solids behavior) and so makes it more difficult to remove the free formaldehyde at distillation. For these products, a free formaldehyde content of 0.5% to 1.5% is standard, although there are also products having a free formaldehyde content of 0.3% to 3% by weight. Here again, methylated and butylated grades and also grades with mixed etherification are widely encountered as commercial products. Etherification with further alkylating substances is described in the literature and available in the form of specialty products.

High-imino grades and methylol grades, each as a subgroup, both feature incomplete methylation, i.e., molar formaldehyde incorporation ratios of less than 1:5.5. The high-imino grades differ from the methylol grades, however, in a high degree of alkylation, i.e., the fraction of etherified methylol groups as a proportion of the formaldehyde equivalents incorporated, of usually up to 80%, whereas the FIGURE for the methylol grades is generally <70%.

Applications for the partly methylated melamine-formaldehyde resins extend across all fields of use, including combinations with HMMM grades, for adaptation of reactivity, where curing temperatures of 100 to 150° C. are called for. Additional catalysis using weak acids is possible and is common practice.

Besides the reaction of the amino resin with the binder, there is a substantially increased proportion of self-crosslinking on the part of the crosslinker. The consequence is a reduced elasticity in the system as a whole, and this must be compensated by appropriate selection of the cocomponent. Set against this is the advantage of reduced total formaldehyde emission from the coatings produced from the system.

As well as amino resins—especially melamine-formaldehyde resins—with only one etherifying alcohol, products with mixed etherification are increasingly gaining in importance.

EP 1784466 describes coating compositions comprising melamine-formaldehyde resins with hydroxy-functional silanes.

A disadvantage of such compositions is that the hydroxy-functional silanes have to be prepared in a polymerization which is costly and inconvenient.

US 2004/214017 describes reaction products of melamine-formaldehyde resins with epoxy- or isocyanate-functionalized silanes.

A disadvantage of these compounds is that these functionalized silanes, on reaction with the melamine-formaldehyde resin, produce an additional functionality, a hydroxyl group or urea group, for example, which reacts in turn with the melamine-formaldehyde resin (hydroxyl group) or lowers the solubility of the product (urea group).

Alkoxysilane-modified melamine-formaldehyde resins have already been described in the unpublished European patent application having the application number 09172660.4 and the filing date of Oct. 9, 2009. A disadvantage of such compounds is the aminic nitrogen, which binds acids that are used to accelerate the cure, and hence diminishes their catalytic effect.

Another group of amino resins, whose construction and properties are very similar to those of the melamine-formaldehyde resins, are the benzoguanamine resins (benzoguanamine/formaldehyde resins). Free OH groups may also be at least partly etherified with lower alcohols, especially $C_1$-$C_4$ alcohols, more preferably methanol or n-butanol.

Other amino resins include, for example, urea resins, in other words polycondensation products of urea and formaldehyde (abbreviated code UF, according to DIN EN ISO 1043-1: 2002-6). Free OH groups may also be at least partly etherified with lower alcohols, especially $C_1$-$C_4$ alcohols, more preferably methanol or n-butanol.

It was an object of the present invention to provide new modifications for amino resins that by way of attached silyl groups feature an additional curing mechanism and produce coatings having improved properties.

This object has been achieved by means of a process for preparing an amino resin carrying silyl groups, which involves in a first step, etherifying or transetherifying at least one optionally etherified amino resin (A) with at least one unsaturated alcohol (B) which carries at least one C=C double bond and at least one hydroxyl group, and subsequently, through a hydrosilylation, adding at least one silane compound (C) which carries at least one SiH bond to at least some of the C=C double bonds thus attached to the amino resin.

As a result of the specific two-step construction of the compounds, amino resins obtained in accordance with the invention do not contain the disruptive amine structures referred to above.

The amino resins (A) may preferably be melamine-formaldehyde resins, benzoguanamine/formaldehyde resins, and urea/formaldehyde resins, each of which may optionally be at least partly etherified, and which preferably are at least partly etherified.

The resins more preferably are at least partly etherified melamine-formaldehyde resins or benzoguanamine/formaldehyde resins, and very preferably are at least partly etherified melamine-formaldehyde resins.

The structure of melamine-formaldehyde resins which can be employed as amino resins (A) in accordance with the invention is, for example, as follows:

As mentioned earlier, melamine-formaldehyde resins are frequently characterized by way of the molar melamine:formaldehyde:alcohol incorporation ratio. The alcohol here is preferably selected from the group consisting of methanol, ethanol, isobutanol and n-butanol or mixtures thereof, and more preferably selected from the group consisting of methanol and n-butanol.

Melamine-formaldehyde resins which can be used in accordance with the invention may have a molar incorporation ratio of 1:2 to 6:1 to 6, though in individual cases, as a result of the formation of oligoformal chains, the formaldehyde incorporation ratio may even be up to 8.

Preferred molar incorporation ratios are 1:3 to 6:1.5 to 6.

For methyl-etherified melamine-formaldehyde resins, molar incorporation ratios of 1:3.6 to 5.7:2.1 to 4.7 are particularly preferred; very much preferred are molar incorporation ratios of 1:5 to 6:3.5 to 6, more particularly 1:5 to 6:4.0 to 5.0.

For n-butyl-etherified melamine-formaldehyde resins, molar incorporation ratios of 1:3.2 to 5.7:1.3 to 4 are particularly preferred; very much preferred are molar incorporation ratios of 1:5 to 6:3.5 to 6, more particularly 1:5 to 6:3.5 to 4.5.

The melamine-formaldehyde resins that can be used may have not only one melamine group per polycondensate but, indeed, two or more melamine groups, preferably up to six, more preferably up to four, very preferably up to three, and more particularly up to two.

The structure of benzoguanamine/formaldehyde resins which can be used as amino resins in accordance with the invention is, for example, as follows:

benzoguanamine-formaldehyde resins as well are frequently characterized by way of the molar benzoguanamine:formaldehyde:alcohol incorporation ratio. The alcohol in this case is preferably selected from the group consisting of methanol, ethanol, isobutanol and n-butanol or mixtures thereof, more preferably selected from the group consisting of methanol and n-butanol.

Benzoguanamine-formaldehyde resins which can be used in accordance with the invention may have a molar incorporation ratio of 1:1.5 to 4:1 to 4, though in certain cases, as a result of formation of oligoformal chains, the formaldehyde incorporation ratio may even be up to 6.

Preference is given to molar incorporation ratios of 1:2 to 4:1.5 to 4.

For methyl-etherified benzoguanamine-formaldehyde resins, molar incorporation ratios of 1:2.2 to 3.7:2.1 to 3.0 are particularly preferred; very particular preference is given to molar incorporation ratios of 1:3 to 4:1.5 to 4, more particularly 1:3 to 4:2.0 to 3.0.

For n-butyl-etherified benzoguanamine-formaldehyde resins, molar incorporation ratios of 1:2.2 to 3.7:1.3 to 2 are particularly preferred; very particular preference is given to molar incorporation ratios of 1:3 to 4:1.5 to 4, more particularly 1:3 to 4:1.5 to 2.5.

The benzoguanamine-formaldehyde resins which can be used may have not only one benzoguanamine group per polycondensate but also, indeed, two or more benzoguanamine groups, preferably up to five, more preferably up to four, very preferably up to three, and more particularly up to two.

The structure of urea/formaldehyde resins which can be used as amino resins in accordance with the invention is, for example, as follows:

urea-formaldehyde resins which can be used in accordance with the invention may have a molar urea/formaldehyde/alcohol incorporation ratio of 1:1-4:0.3-3, preferably 1:1-3:0.4-2, more preferably 1:1.5-2.5:0.5-1.5, very preferably 1:1.6-2.1:0.6-1.3.

The alcohol here is preferably selected from the group consisting of methanol, ethanol, isobutanol and n-butanol or mixtures thereof, and more preferably selected from the group consisting of methanol and n-butanol.

The urea/formaldehyde resins also include what are called glycoluril resins, which form through the reaction of glycoluril—the reaction product of glyoxal with two equivalents of urea—with formaldehyde, and are optionally etherified with one or more alcohols.

The present invention further provides silylated melamine-formaldehyde resins of the formula (I)

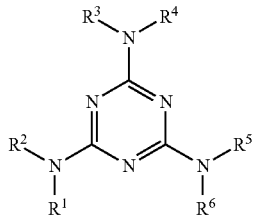

in which the radicals $R^1$ to $R^6$ in each case independently of one another may be a) a hydrogen atom (—H) as a radical, b) —[—$CH_2$—O—]$_m$—H in which m is a positive integer of at least 1, c) —[—$CH_2$—O—]$_n$—$R^7$, in which n is a positive integer of at least 1 and $R^7$ is an alkyl radical, d) a radical of the formula (II)

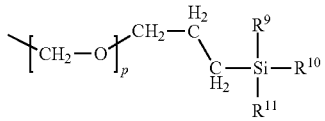

in which p is a positive integer of at least 1, $R^9$ to $R^{11}$ may independently of one another be an alkyl radical or a radical —O—$R^{12}$, in which $R^{12}$ is an alkyl or aryl radical a radical of the formula (IIIa)

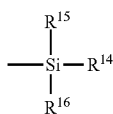

or a radical of the formula (IIIb)

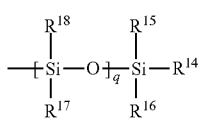

in which $R^{14}$ to $R^{18}$ independently of one another may be alkyl, aryl, alkyloxy, aryloxy, cycloalkyl, and cycloalkyloxy, and q is a positive integer of at least 1, e) a radical of the formula (IV)

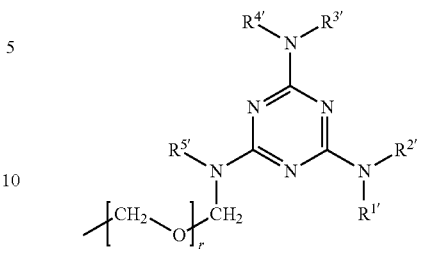

in which r may be zero or a positive integer of at least 1 and the radicals $R^{1'}$ to $R^{5'}$ may in each case independently of one another be selected from the groups a) to d), with the proviso that at least one of the radicals $R^1$ to $R^6$, and also of the radicals $R^{1'}$ to $R^{5'}$, where present, is a radical of the formula (II), and not more than two radicals $R^1$ to $R^6$ in each case are a radical of the formula (IV).

The silylated melamine-formaldehyde resins of the invention, as compared with the unmodified melamine-formaldehyde resins, exhibit higher gloss and/or enhanced scratch resistance.

The variables in formula (I) above have the following definition:

$R^7$ is alkyl, preferably $C_1$ to $C_4$ alkyl, more preferably methyl, ethyl, isobutyl or n-butyl, very preferably methyl or n-butyl, and especially methyl.

Alkyl in the context of the present specification refers to straight-chain or branched alkyl groups having one to 20 carbon atoms, preferably $C_1$-$C_8$ alkyl groups, i.e., for example, methyl, ethyl, n-propyl, isopropyl, n-butyl, isobutyl, 2-butyl, tert-butyl, 1-pentyl, 2-pentyl, isoamyl, n-hexyl, n-octyl or 2-ethylhexyl.

$C_1$-$C_4$ alkyl refers in this specification to methyl, ethyl, n-propyl, isopropyl, n-butyl, isobutyl, 2-butyl, or tert-butyl.

$R^9$ to $R^{11}$ may independently of one another be alkyl, a radical of the formula —O—$R^{12}$, or of the formula (IIIa) or (IIIb), preferably a radical of the formula —O$R^{12}$, more preferably with $R^{12}$ as alkyl, very preferably methyl or ethyl, and more particularly ethyl.

The radicals $R^{1'}$ to $R^{5'}$ may each independently of one another be selected from the groups a) to d). It will be appreciated that the radicals $R^{1'}$ to $R^{5'}$ are present in the silylated melamine-formaldehyde resins of the invention only when at least one of the radicals $R^1$ to $R^6$ denotes a radical of the formula (IV).

m is a positive integer from 1 to 4, preferably from 1 to 3, more preferably from 1 to 2, and very preferably 1.

n is a positive integer from 1 to 4, preferably from 1 to 3, more preferably from 1 to 2, and very preferably 1.

p is a positive integer from 1 to 4, preferably from 0 to 3, more preferably from 0 to 2, very preferably zero or 1, and more particularly 1.

q is zero or a positive integer from 1 to 4, preferably from 1 to 3, more preferably from 1 to 2 and very preferably 1.

r is zero or a positive integer from 1 to 4, preferably from 0 to 3, more preferably from 0 to 2, very preferably zero or 1, and more particularly 1.

Preferably not more than one of the radicals $R^1$ to $R^6$ is a radical of the formula (IV), more preferably only one or none.

The present invention additionally provides silylated benzoguanamine-formaldehyde resins of the formula (Ia)

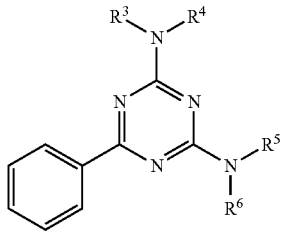

in which the radicals $R^3$ to $R^6$ in each case independently of one another may be a) a hydrogen atom (—H) as a radical, b) —[—CH$_2$—O—]$_m$—H, in which m is a positive integer of at least 1, c) —[—CH$_2$—O—]$_n$—R$^7$, in which n is a positive integer of at least 1 and $R^7$ is an alkyl radical, d) a radical of the formula (II)

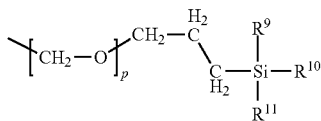

in which p is a positive integer of at least 1, $R^9$ to $R^{11}$ may independently of one another be an alkyl radical or a radical in which $R^{12}$ is an alkyl or aryl radical a radical of the formula (IIIa)

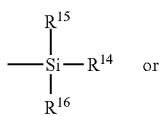

a radical of the formula (IIIb)

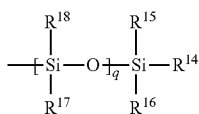

in which $R^{14}$ to $R^{18}$ independently of one another may be alkyl, aryl, alkyloxy, aryloxy, cycloalkyl, and cycloalkyloxy, and q is a positive integer of at least 1, e) a radical of the formula (IVa)

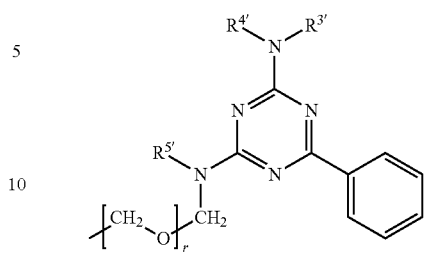

in which r may be zero or a positive integer of at least 1 and the radicals $R^{3'}$ to $R^{5'}$ may in each case independently of one another be selected from the groups a) to d), with the proviso that at least one of the radicals $R^3$ to $R^6$, and also of the radicals $R^{3'}$ to $R^{6'}$, where present, is a radical of the formula (II), and not more than two radicals $R^3$ to $R^6$ in each case are a radical of the formula (IVa).

The silylated benzoguanamine-formaldehyde resins of the invention, as compared with the unmodified benzoguanamine-formaldehyde resins, exhibit higher gloss and/or enhanced scratch resistance.

The variables in formula (Ia) above have the following definition:

$R^7$ is alkyl, preferably $C_1$ to $C_4$ alkyl, more preferably methyl, ethyl, isobutyl or n-butyl, very preferably methyl or n-butyl, and especially methyl.

Alkyl in the context of the present specification refers to straight-chain or branched alkyl groups having one to 20 carbon atoms, preferably $C_1$-$C_8$ alkyl groups, i.e., for example, methyl, ethyl, n-propyl, isopropyl, n-butyl, isobutyl, 2-butyl, tert-butyl, 1-pentyl, 2-pentyl, isoamyl, n-hexyl, n-octyl or 2-ethylhexyl.

$C_1$-$C_4$ alkyl refers in this specification to methyl, ethyl, n-propyl, isopropyl, n-butyl, isobutyl, 2-butyl, or tert-butyl.

$R^9$ to $R^{11}$ may independently of one another be alkyl, a radical of the formula —O—$R^{12}$, or of the formula (IIIa) or (IIIb), preferably a radical of the formula —O$R^{12}$, more preferably with $R^{12}$ as alkyl, very preferably methyl or ethyl, and more particularly ethyl.

The radicals $R^{3'}$ to $R^{5'}$ may each independently of one another be selected from the groups a) to d). It will be appreciated that the radicals $R^{3'}$ to $R^{5'}$ are present in the silylated benzoguanamine-formaldehyde resins of the invention only when at least one of the radicals $R^3$ to $R^6$ denotes a radical of the formula (IVa).

m is a positive integer from 1 to 4, preferably from 1 to 3, more preferably from 1 to 2, and very preferably 1.

n is a positive integer from 1 to 4, preferably from 1 to 3, more preferably from 1 to 2, and very preferably 1.

p is zero or a positive integer from 1 to 4, preferably from 0 to 3, more preferably from 0 to 2, very preferably zero or 1, and more particularly 1.

q is a positive integer from 1 to 4, preferably from 1 to 3, more preferably from 1 to 2 and very preferably 1.

r is zero or a positive integer from 1 to 4, preferably from 0 to 3, more preferably from 0 to 2, very preferably zero or 1, and more particularly 1.

Preferably not more than one of the radicals $R^3$ to $R^6$ is a radical of the formula (IVa), more preferably only one or none.

The silylated amino resins of the invention are obtainable, for example, by two-step reaction of the corresponding amino resins, as for example the melamine-formaldehyde resins corresponding to the compounds of the formula (I), i.e., melamine-formaldehyde resins of the formula (I) in which the radical of the formula (II) is replaced by a group —[—CH$_2$—O—]$_p$—H. In the first step, this compound is reacted with an unsaturated monoalcohol (B), preferably allyl alcohol, whose double bond, in the next step, has a compound (C) of the formula (V) added to it, by means of transition metal-catalyzed, preferably platinum-catalyzed, hydrosilylation.

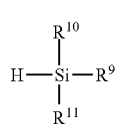

(V)

where R$^9$-R$^{11}$ have the above definition.

This platinum-catalyzed hydrosilylation is frequently carried out as follows: The reaction product of the amino resin (A) that is used with the unsaturated monoalcohol (B) is introduced at ambient temperature into a reaction vessel, equipped with a device for maintaining an inert gas blanket, preferably of nitrogen or argon, and, under this inert gas blanket, the silicon hydride (V), in solution in an anhydrous inert solvent, is added. Added with stirring is a catalyst, such as a transition metal, for example, preferably a noble metal from transition group VIII, more preferably nickel, nickel salts, iridium salts, and very preferably chloroplatinic acid, is then added. The temperature is raised, under inert gas blanketing, to about 60° C. The reaction can be monitored by NMR spectroscopy for the disappearance of the multiplet of the vinylic methine proton (—CH=5.9 ppm in CDCl$_3$) of the allyl group.

The amino resin used may comprise at least one solvent, such as water, C$_1$-C$_4$ alkyl alcohols, as for example, methanol, ethanol, isopropanol, n-propanol, n-butanol, isobutanol, sec-butanol or tert-butanol, or aromatic hydrocarbons, such as toluene or xylene isomer mixtures, for example.

The free formaldehyde content of the amino resin used is generally not more than 1.5% by weight; for example, it may be not more than 1.0%, preferably not more than 0.%, more preferably not more than 0.3%, and very preferably not more than 0.1% by weight.

The compound (B) comprises at least one, preferably just one, unsaturated alcohol (B), which carries at least one, preferably just one, C=C double bond and at least one, preferably just one, hydroxyl group.

The C=C double bonds in accordance with the invention are unactivated double bonds, i.e., those C=C double bonds or conjugated double bond systems which are not joined directly—i.e., in direct vicinity—to any groups other than hydrogen and sp$^3$-hybridized carbon atoms. The sp$^3$-hybridized carbon atoms of this kind may be, for example, in alkyl groups, unsubstituted methylene groups, singly substituted (1,1-alkylene) or doubly substituted (n,n-alkylene) groups.

In the case of conjugated double bond systems, the C=C double bond is conjugated with one or more further C=C double bonds and/or aromatic systems, in which case there are preferably one to three, more preferably one or two, and very preferably just one further C=C double bond, or preferably just one carbocyclic aromatic ring system. Important in accordance with the invention is that, in this case, the conjugated double bond system is not connected directly to any groups other than hydrogen and sp$^3$-hybridized carbon atoms. The aromatic ring system is a carbocyclic ring system; heteroaromatic systems are excluded in accordance with the invention.

Preferably the C=C double bonds are isolated double bonds; alcohols (B) with conjugated double bond systems are less preferred.

Excluded, conversely, are those C=C double bonds which are electronically activated, in other words, for example, vinyl ether groups, acrylate groups or methacrylate groups.

Between the C=C double bonds and hydroxyl groups there is at least one sp$^3$-hybridized carbon atom, preferably one to ten, more preferably one to five, very preferably one to three, more particularly one to two, and especially one.

Examples of compounds (B) of this kind are allyl alcohol (2-propen-1-ol), methallyl alcohol (2-methyl-2-propen-1-ol), homoallyl alcohol (3-buten-1-ol), 1-buten-3-ol, 3-methyl-2-buten-1-ol, 2-methyl-3-buten-2-ol, 1-octen-3-ol, 2-hexen-1-ol, 1-penten-3-ol, and also, in addition, phytol, farnesol, and linalool.

Examples of compounds (B) having two or more C=C double bonds are 1,4-pentadien-3-ol, 1,4-hexadien-3-ol, and 5-methyl-1,4-hexadien-3-ol. Compounds having two or more C=C double bonds, however, are less preferred.

An example of compounds (B) having C=C double bonds which are conjugated to a carbocyclic aromatic ring system is cinnamyl alcohol. Compounds having C=C double bonds conjugated to aromatics, however, are less preferred.

Preferred are allyl alcohol, methallyl alcohol, and homoallyl alcohol; allyl alcohol is particularly preferred.

The compound (C) is of the formula (V):

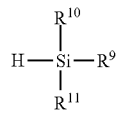

(V)

where R$^9$-R$^{11}$ have the definition above.

R$^9$ to R$^{11}$ therein denote preferably, independently of one another a C$_1$-C$_4$ alkyl radical or a radical —O—R$^{12}$, in which R$^{12}$ is a C$_1$-C$_4$ alkyl or phenyl radical.

With particular preference R$^9$ to R$^{11}$ are selected from the group consisting of methyl, ethyl, isopropyl, n-butyl, tert-butyl, methoxy, ethoxy, tert-butyloxy, and phenoxy, very preferably from the group consisting of methyl, ethyl, methoxy, and ethoxy.

The silanes (C) used are preferably tris(alkyloxy)silanes or alkylbis(alkyloxy)silanes, more preferably tris(C$_1$-C$_4$-alkyloxy)silanes or C$_1$-C$_4$-allylbis(C$_1$-C$_4$-alkyloxy)silanes.

The silanes (C) used are very preferably triethylsilane, triethylsilane, triisopropylsilane, dimethylphenylsilane, diethoxymethylsilane, dimethoxymethylsilane, ethoxydimethylsilane, phenoxydimethylsilane, triethoxysilane, trimethoxysilane, bistrimethylsiloxymethylsilane or mixtures thereof.

One preferred embodiment of the present invention involves using, as mixtures of silanes (C), a mixture of tris(alkyloxy)silanes with alkylbis(alkyloxy)silanes in a ratio of 5:1 to 1:5, preferably of 4:2 to 2:4, and more preferably of about 3:3.

The stoichiometry of unsaturated alcohol (B) to the ether groups in the amino resin that are to be replaced is generally from 0.2:1 to 1:0.2.

The stoichiometry of silane (C) of formula (V) to double bonds in the amino resin thus etherified or transetherified, obtained by reaction with an unsaturated alcohol, is generally from 0.1:1 to 1.0:1, preferably from 0.5:1 to 1.0:1, more preferably from 0.6:1 to 1.0:1, and very preferably from 0.8:1 to 1.0:1.

Also conceivable is the use of compounds (C) which carry more than one Si—H bond—for example, at least two, preferably two to four, more preferably two or three, and very preferably two.

Examples of such are siloxane-bridged compounds (C1) of the formula

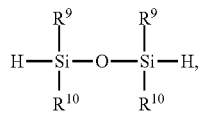

in which $R^9$ and $R^{10}$ can have the definitions above.

Examples thereof are tetramethylsiloxane, tetraethylsiloxane, and tetraphenylsiloxane.

The reaction to form the silylated amino resins of the invention may take place in the first stage preferably between 40 and 120° C., more preferably between 60 and 110° C., and very preferably between 80 and 100° C., and in the second stage preferably between 40 and 80° C., more preferably between 50 and 70° C., and very preferably at 60° C.

The reaction can be carried out in bulk, but is preferably carried out in an inert, anhydrous solvent.

The reaction of the amino resin used with the unsaturated alcohol may take place with or without catalysis and with or without addition of an azeotrope former, such as toluene. If a catalyst is used, it is preferably an acid. Examples of acids are given below. Depending on the desired degree of substitution, the unsaturated alcohol is used in a ratio of 1:1-20:1 (molar) with respect to amino resin, preferably in a ratio of 6:6 to 15:6, particularly preferably in a ratio of approximately 10:6. The excess alcohol is removed from the reaction mixture after the end of the reaction, under reduced pressure and at not more than 50° C. Further heating of the reaction mixture may lead to the polymerization of the amino resin.

One preferred embodiment of the present invention involves selecting the ratio of alcohol (B) to amino resin (A) such that the resultant resin has a degree of substitution with alcohol (B) per melamine nucleus of preferably at least three, more preferably four to six, and very preferably five to six. If necessary, a product which carries only a few alcohol groups (B) may be reacted further by addition of further alcohol (B).

The reaction of the unsaturated alcohol (B) with the amino resin (A) may take place as a transetherification, in which alkyl groups present in the amino resin are eliminated and replaced by the unsaturated alcohol (B), or as an etherification, where free hydroxyl groups present in the amino resin are substituted by the unsaturated alcohol (B). Generally speaking, etherification and transetherification proceed simultaneously, where there are free hydroxyl groups present.

The addition of the silane (C) to the double bond of the unsaturated alcohol (B) takes place with transition metal catalysis. Transition metals contemplated are preferably those of the eighth transition group, more preferably platinum, rhodium, palladium, cobalt, and nickel, in metallic form or in the form of the complexes. One preferred catalyst, for example, is that known as the Karstedt catalyst (platinum-divinyl-tetramethyldisiloxane), or hexachloroplatinic acid hydrate, in the form, for example, of the Speier catalyst, in other words in the form of the solution in isopropanol, and also platinum on activated carbon.

Generally speaking, the reaction in the first stage is carried out by introducing the unsaturated alcohol used, together if desired with the catalyst, bringing it to the desired temperature, and slowly adding the amino resin, if desired in solution in a suitable solvent.

The methanol liberated is collected continuously in a water separator and the reaction is terminated when the theoretical amount of methanol has been separated off. If water is present in the reaction mixture, it is advantageous to use a short Vigreux column for effective separation of the azeotrope, comprising unsaturated alcohol and water, from the methanol formed. Preferably, however, the reaction is carried out in the absence of water. For this purpose, the unsaturated alcohol employed is distilled over potassium carbonate or another suitable drying agent before being used.

The reaction product obtained can be purified by column chromatography on silica gel (Silicagel Si 60, 40-63 μm, Merck) with an eluent mixture of ethyl acetate and pentane in a ratio of 1:2. In general, however, the level of impurities in the crude product is minimal, and it can be used in the subsequent synthesis without further purification.

The second reaction stage is generally carried out by introducing the preliminary product from the first reaction stage, preferably under an inert atmosphere, together with the corresponding silane, in an anhydrous, inert solvent, and adding—with vigorous stirring—a solution of the transition metal catalyst in the same solvent. The reaction mixture is stirred at the abovementioned temperature for 30 minutes to 3 hours, preferably 1 to 2 hours, and subsequently, if desired, is freed from solvent under reduced pressure. There is no need for the product to be worked up.

Suitable acidic catalysts are sulfuric acid, nitric acid, phosphoric acid, hydrochloric acid, para-toluenesulfonic acid, benzenesulfonic acid, dodecylbenzenesulfonic acid, methanesulfonic acid or mixtures thereof; acidic ion exchangers can also be contemplated. Preference is given to sulfonic acids, particular preference to para-toluenesulfonic acid.

The acidic catalyst is added generally in amounts of 0.1% to 1% by weight, preferably 0.1% to 0.5% by weight. It may be useful to introduce the catalyst in a number of portions.

The silylated amino resin obtained has a viscosity at 23° C. in accordance with ISO 3219/B of preferably between 100 and 20 000 mPas, more preferably between 500 and 10 000 mPas.

The shear rate in this case ought preferably to be $250 \text{ s}^{-1}$.

The number-average molar weight $M_n$ of the silylated amino resins obtained, especially melamine-formaldehyde resins, is generally less than 3500 g/mol, preferably less than 3000 g/mol, and more preferably less than 2500 (as determined by gel permeation chromatography using tetrahydrofuran and polystyrene as standard, DIN 55672, part 1).

In one preferred embodiment the acid number of the amino resins obtained, especially the melamine-formaldehyde resins, is less than 3, more preferably less than 2 mg KOH/g, as determined in accordance with ISO 3682.

The free formaldehyde content of the silylated amino resins of the invention is generally not more than 0.2% by weight, preferably not more than 0.15% by weight, and more preferably not more than 0.1% by weight.

The free formaldehyde content is determined in accordance with EN ISO 9020.

The silylated amino resins obtained in accordance with the invention, especially melamine-formaldehyde resin, may subsequently be mixed with commonplace solvents.

Examples of such solvents are aromatic and/or (cyclo) aliphatic hydrocarbons and mixtures thereof, halogenated hydrocarbons, esters, ethers, and alcohols.

Preference is given to aromatic hydrocarbons, (cyclo)aliphatic hydrocarbons, alkanoic acid alkyl esters, alkoxylated alkanoic acid alkyl esters, and mixtures thereof.

Particular preference is given to mono- or polyalkylated benzenes and naphthalenes, alkanoic acid alkyl esters and alkoxylated alkanoic acid alkyl esters, and mixtures thereof.

Preferred aromatic hydrocarbon mixtures are those which comprise predominantly aromatic $C_7$ to $C_{14}$ hydrocarbons and which span a boiling range from 110 to 300° C.; particular preference is given to toluene, o-, m- or p-xylene, trimethylbenzene isomers, tetramethylbenzene isomers, ethylbenzene, cumene, tetrahydronaphthalene, and mixtures comprising them.

Examples thereof are the Solvesso® grades from ExxonMobil Chemical, especially Solvesso® 100 (CAS No. 64742-95-6, predominantly C9 and C10 aromatics, boiling range about 154-178° C.), 150 (boiling range about 182-207° C.), and 200 (CAS No. 64742-94-5), and also the Shellsol® grades from Shell. Hydrocarbon mixtures of paraffins, cycloparaffins, and aromatics are also available commercially under the Kristalloel names (for example, Kristalloel 30, boiling range about 158-198° C. or Kristalloel 60: CAS No. 64742-82-1), white spirit (for example likewise CAS No. 64742-82-1) or solvent naphtha (light: boiling range about 155-180° C., heavy: boiling range about 225-300° C.). The aromatics content of hydrocarbon mixtures of this type is generally more than 90%, preferably more than 95%, more preferably more than 98%, and very preferably more than 99%, by weight. It may be sensible to use hydrocarbon mixtures having a particularly reduced naphthalene content.

The density at 20° C. to DIN 51757 of the hydrocarbons can be less than 1 $g/cm^3$, preferably less than 0.95 and more preferably less than 0.9 $g/cm^3$.

The aliphatic hydrocarbons content is generally less than 5%, preferably less than 2.5%, and more preferably less than 1%, by weight.

Halogenated hydrocarbons are for example chlorobenzene and dichlorobenzene or its isomer mixtures.

Esters are for example n-butyl acetate, ethyl acetate, 1-methoxyprop-2-yl acetate, and 2-methoxyethyl acetate, and also the monoacetyl and diacetyl esters of ethylene glycol, diethylene glycol, triethylene glycol, propylene glycol, dipropylene glycol or tripropylene glycol, such as, for example, butylglycol acetate. Further examples are also carbonates, such as preferably 1,2-ethylene carbonate, 1,2-propylene carbonate or 1,3-propylene carbonate.

Ethers are for example tetrahydrofuran (THF), dioxane, and also the dimethyl, diethyl or di-n-butyl ethers of ethylene glycol, diethylene glycol, triethylene glycol, propylene glycol, dipropylene glycol or tripropylene glycol.

(Cyclo)aliphatic hydrocarbons are for example decalin, alkylated decalin, and isomer mixtures of linear or branched alkanes and/or cycloalkanes.

Of further preference are n-butyl acetate, ethyl acetate, 1-methoxyprop-2-yl acetate, 2-methoxyethyl acetate, and also mixtures thereof, especially with the aromatic hydrocarbon mixtures set out above.

Mixtures of this kind may be produced in a volume ratio of 10:1 to 1:10, preferably in a volume ratio of 5:1 to 1:5, and more preferably in a volume ratio of 1:1.

Preferred examples are butyl acetate/xylene, 1:1 methoxypropyl acetate/xylene, 1:1 butyl acetate/solvent naphtha 100, 1:2 butyl acetate/Solvesso® 100, and 3:1 Kristalloel 30/Shellsol® A.

Alcohols are for example methanol, ethanol, n-propanol, isopropanol, n-butanol, sec-butanol, isobutanol, pentanol isomer mixtures, hexanol isomer mixtures, 2-ethylhexanol or octanol.

It is an advantage of the silylated amino resins of the invention that, in coating materials, they exhibit hardness and gloss properties that are comparable with or even an improvement on those of the unsilylated amino resins. In addition, they have a further crosslinking mechanism, via the silyl groups that are present.

Curing is generally accomplished by drying the coatings—following application, the coating of the substrates with the coating compositions or formulations comprising the amino resins of the invention, optionally admixed with further, typical coatings additives and thermally curable resins—if desired at a temperature below 80° C., preferably room temperature to 60° C., and more preferably room temperature to 40° C., for a time of up to 72 hours, preferably up to 48 hours, more preferably up to 24 hours, very preferably up to 12 hours, and in particular up to 6 hours, and subjecting them to thermal treatment (curing) under an oxygen-containing atmosphere, preferably air, or under inert gas at temperatures between 80 and 270° C., preferably between 100 and 240° C., and more preferably between 120 and 180° C. Curing of the coating takes place, as a function of the amount of coating material applied and of the crosslinking energy introduced, via high-energy radiation, heat transfer from heated surfaces, or via convection of gaseous media, over a period of from seconds, for example, in the case of coil coating in combination with NIR drying, up to 5 hours, for example, high-build systems on temperature-sensitive materials, usually not less than 10 minutes, preferably not less than 15 minutes, more preferably not less than 30 minutes, and very preferably not less than 45 minutes. Drying essentially comprises removal of existing solvent, and in addition there may also even at this stage be reaction with the binder, whereas curing essentially comprises reaction with the binder.

Instead of or in addition to thermal curing, curing may also take place by means of IR and NIR radiation, with NIR radiation here denoting electromagnetic radiation in the wavelength range from 760 nm to 2.5 μm, preferably from 900 to 1500 nm.

Curing takes place in a time of 1 second to 60 minutes, preferably of 1 minute to 45 minutes.

The present invention further provides coating compositions comprising at least one silylated amino resin of the invention.

As binders, coating compositions of this kind comprise at least one binder comprising groups that are reactive toward amino resins. These are, generally, selected from the group consisting of epoxy-containing binders, hydroxyl-containing binders, carboxyl-containing binders, and amino-containing binders.

The hydroxyl-containing binder preferably comprises polyetherols, polyesterols, polyacrylate polyols, polycarbonate polyols, alkyd resins or epoxy resins. Polyesterols and polyacrylate polyols are particularly preferred, very particular preference being given to polyacrylate polyols.

The binders have on average per molecule at least two, preferably two to ten, more preferably three to ten, and very preferably three to eight hydroxyl groups.

The OH number, measured to DIN 53240-2, is generally from 10 to 200 mg KOH/g, preferably from 30 to 140.

The binders may additionally have an acid number to DIN EN ISO 3682 of 0 to 200 mg KOH/g, preferably 0-100, and more preferably 0 to 10 mg KOH/g.

The polyacrylate polyols are, for example, those which are copolymers of (meth)acrylic esters with at least one compound having at least one, preferably precisely one, hydroxyl group and at least one, preferably precisely one, (meth)acrylate group.

The latter may be, for example, monoesters of α,β-unsaturated carboxylic acids, such as acrylic acid, methacrylic acid (referred to in this text for short as "(meth)acrylic acid"), with diols or polyols which have preferably 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, poly-THF having a molar weight between 162 and 2000, poly-1,3-propanediol or polypropylene glycol having a molar weight between 134 and 2000, or polyethylene glycol having a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

The hydroxyl-bearing monomers are employed in the copolymerization in mixture with other polymerizable, preferably free-radically polymerizable, monomers, preferably those composed of more than 50% by weight of $C_1$-$C_{20}$ alkyl (meth)acrylate, vinylaromatics having up to 20 carbon atoms, vinyl esters of carboxylic acids comprising up to 20 carbon atoms, vinyl halides, nonaromatic hydrocarbons having 4 to 8 carbon atoms and 1 or 2 double bonds, unsaturated nitriles, and mixtures thereof. Particular preference is given to the polymers composed of more than 60% by weight of $C_1$-$C_{10}$ alkyl (meth)acrylates, styrene or mixtures thereof.

The polymers may further comprise hydroxyl-functional monomers in keeping with the above hydroxyl group content, and, if desired, further monomers, examples being ethylenically unsaturated acids, especially carboxylic acids, acid anhydrides or acid amides.

Further binders are polyesterols, such as are obtainable by condensing polycarboxylic acids, especially dicarboxylic acids, with polyols, especially diols.

Polyester polyols are known for example from Ullmanns Encyklopädie der technischen Chemie, 4th edition, volume 19, pp. 62 to 65. It is preferred to use polyester polyols obtained by reacting dihydric alcohols with dibasic carboxylic acids. In lieu of the free polycarboxylic acids it is also possible to use the corresponding polycarboxylic anhydrides or polycarboxylic esters of lower alcohols, or mixtures thereof, to prepare the polyester polyols. The polycarboxylic acids may be aliphatic, cycloaliphatic, araliphatic, aromatic or heterocyclic and may be optionally substituted, by halogen atoms for example, and/or unsaturated. Examples thereof that may be mentioned include the following:

Oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, isomers thereof, hydrogenation products thereof, and esterifiable derivatives thereof, such as anhydrides or dialkyl esters, such as $C_1$-$C_4$ alkyl esters, preferably methyl, ethyl or n-butyl esters, of the stated acids. Preference is given to dicarboxylic acids of the general formula HOOC—$(CH_2)_y$—COOH, in which y is a number from 1 to 20, preferably an even number from 2 to 20; particular preference is given to succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if desired may be alkoxylated as described above.

Preference is given to alcohols of the general formula HO—$(CH_2)_x$—OH, in which x is a number from 1 to 20, preferably an even number from 2 to 20. Preference is given to ethylene glycol, butane-1,4-diol, hexane-1,6-diol, octane-1,8-diol and dodecane-1,12-diol. Preference is further given to neopentyl glycol.

Also suitable are polycarbonate diols, such as may be obtained, for example, by reacting phosgene with an excess of the low molecular mass alcohols as specified as synthesis components for the polyester polyols.

Also suitable are lactone-based polyester diols, which are homopolymers or copolymers of lactones, preferably hydroxy-terminal products of lactones with suitable difunctional starter molecules. Suitable lactones are preferably those derived from compounds of the general formula HO—$(CH_2)_z$—COOH, in which z is a number from 1 to 20 and one hydrogen atom of a methylene unit may also be substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Suitable starter components are, for example, the low molecular mass dihydric alcohols specified above as a synthesis component for the polyester polyols. The corresponding polymers of ε-caprolactone are particularly preferred. Lower polyester diols or polyether diols as well can be used as starters for preparing the lactone polymers. In lieu of the polymers of lactones it is also possible to use the corresponding, chemically equivalent polycondensates of the hydroxycarboxylic acids corresponding to the lactones.

Further suitable polymers are polyetherols, which are prepared by addition reaction of ethylene oxide, propylene oxide or butylene oxide with H-active components. Polycondensates of butanediol are suitable as well.

The polymers can of course also be compounds having primary or secondary amino groups.

Suitability is further possessed by polycarbonate polyols, such as may be obtained, for example, by reacting phosgene with an excess of the low molecular mass alcohols specified as synthesis components for the polyester polyols.

Alkyd resins are polycondensation resins made from polyols, polybasic carboxylic acids, and fatty oils, or free natural and/or synthetic fatty acids; at least one polyol must have a functionality of three or more.

As polyols and polybasic carboxylic acids it is possible for example to employ the components specified above in connection with the polyesterols.

Preferred polyhydric alcohols are glycerol, pentaerythritol, trimethylolethane, trimethylolpropane, various diols such as ethane-/propanediol, diethylene glycol, neopentyl glycol.

Preferred polybasic carboxylic acids are phthalic acid (anhydride) (PAA), isophthalic acid, terephthalic acid, trimellitic anhydride, adipic acid, azelaic acid, sebacic acid.

Examples of suitable oil components and/or fatty acids include drying oils, such as linseed oil, oiticica oil or tung oil, semidrying oils, such as soybean oil, sunflower oil, safflower oil, castor oil or tall oil, nondrying oils, such as castor oil, coconut oil or peanut oil, or free fatty acids of above oils, or synthetic monocarboxylic acids.

The molar mass of typical alkyd resins is between 1500 and 20 000, preferably between 3500 and 6000. The acid number is preferably 2 to 30 mg KOH/g, or 35-65-mg KOH/g in the case of water-thinnable resins. The OH number is generally up to 300, preferably up to 100 mg KOH/g.

Polyacrylate polyols, polyesterols and/or polyetherols of this kind have a molecular weight $M_n$ of preferably at least 1000, more preferably at least 2000, and very preferably at least 5000 g/mol. The molecular weight $M_n$ can be for example up to 200 000, preferably up to 100 000, more preferably up to 80 000, and very preferably up to 50 000 g/mol.

It is also possible to add co-crosslinkers to the coating compositions, examples being trisalkylcarbamoyltriazines (TACT), preferably trismethylcarbamoyltriazines, tris-n-butylcarbamoyltriazines and mixed methylated/n-butylated trisalkylcarbamoyltriazines.

Furthermore, the amino resins of the invention, especially the melamine-formaldehyde resins, may also be used together with noncrosslinkable binders, i.e., those without groups that are reactive toward melamine-formaldehyde resins. In this case the amino resins of the invention crosslink by condensation of their silane groups with one another.

The crosslinking is accelerated by addition of acids.

Weak acids for the purposes of this text are monobasic or polybasic, organic or inorganic, preferably organic, acids having a $pK_a$ of between 1.6 and 5.2, preferably between 1.6 and 3.8.

Examples thereof are carbonic acid, phosphoric acid, formic acid, acetic acid, and maleic acid, glyoxylic acid, bromoacetic acid, chloroacetic acid, thioglycolic acid, glycine, cyanoacetic acid, acrylic acid, malonic acid, hydroxypropanedioic acid, propionic acid, lactic acid, 3-hydroxypropionic acid, glyceric acid, alanine, sarcosine, fumaric acid, acetoacetic acid, succinic acid, isobutyric acid, pentanoic acid, ascorbic acid, citric acid, nitrilotriacetic acid, cyclopentanecarboxylic acid, 3-methylglutaric acid, adipic acid, hexanoic acid, benzoic acid, cyclohexanecarboxylic acid, heptanedioic acid, heptanoic acid, phthalic acid, isophthalic acid, terephthalic acid, tolylic acid, phenylacetic acid, phenoxyacetic acid, mandelic acid or sebacic acid.

Preference is given to organic acids, preferably monobasic or polybasic carboxylic acids. Particular preference is given to formic acid, acetic acid, maleic acid or fumaric acid.

Strong acids for the purposes of this text are monobasic or polybasic, organic or inorganic, preferably organic acids having a $pK_a$ of less than 1.6 and more preferably less than 1.

Examples thereof are sulfuric acid, pyrophosphoric acid, sulfurous acid, and tetrafluoroboric acid, trichloroacetic acid, dichloroacetic acid, oxalic acid, and nitroacetic acid.

Preference is given to organic acids, preferably organic sulfonic acids. Particular preference is given to methanesulfonic acid, para-toluenesulfonic acid, benzenesulfonic acid, dodecylbenzenesulfonic acid, cyclododecanesulfonic acid, and camphorsulfonic acid.

The acids are used in amounts in general of up to 10% by weight, preferably 0.1% to 8%, more preferably 0.3% to 6%, very preferably 0.5% to 5%, and in particular from 1% to 3% by weight, based on the amino resin employed.

The acids may also be used as free acids or in blocked form.

Examples of further, typical coatings additives used can be antioxidants, stabilizers, activators (accelerants), fillers, pigments, dyes, antistatic agents, flame retardants, thickeners, thixotropic agents, surface-active agents, viscosity modifiers, plasticizers or chelating agents.

Suitable thickeners, in addition to free-radically (co)polymerized (co)polymers, include customary organic and inorganic thickeners such as hydroxymethylcellulose or bentonite.

Chelating agents which can be used include, for example, ethylenediamineacetic acid and its salts, and also β-diketones.

Suitable fillers comprise silicates, examples being silicates obtainable by silicon tetrachloride hydrolysis, such as Aerosil® from Degussa, siliceous earth, talc, aluminum silicates, magnesium silicates, calcium carbonates, etc.

Suitable stabilizers comprise typical UV absorbers such as oxanilides, triazines, and benzotriazole (the latter available as Tinuvin® grades from Ciba-Spezialitätenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacinate. Stabilizers are used usually in amounts of 0.1% to 5.0% by weight, based on the solid components comprised in the preparation.

Pigments may likewise be comprised. Pigments, according to CD Römpp Chemie Lexikon—Version 1.0, Stuttgart/N.Y.: Georg Thieme Verlag 1995, with reference to DIN 55943, are particulate, organic or inorganic, chromatic or achromatic colorants which are virtually insoluble in the application medium.

Virtually insoluble here means a solubility at 25° C. of below 1 g/1000 g of application medium, preferably below 0.5 g, more preferably below 0.25 g, very preferably below 0.1 g, and in particular below 0.05 g/1000 g of application medium.

Examples of pigments comprise any desired systems of absorption pigments and/or effect pigments, preferably absorption pigments. There are no restrictions whatsoever governing the number and selection of the pigment components. They can be adapted as desired to the particular requirements, such as the desired color impression, for example.

By effect pigments are meant all pigments which exhibit a platelet-shaped construction and impart specific decorative color effects to a surface coating. The effect pigments comprise, for example, all of the effect-imparting pigments which can be employed commonly in vehicle finishing and industrial coating. Examples of effect pigments of this kind are pure metal pigments, such as aluminum, iron or copper pigments; interference pigments, such as titanium-dioxide-coated mica, iron-oxide-coated mica, mixed-oxide-coated mica (e.g., with titanium dioxide and $Fe_2O_3$ or titanium dioxide and $Cr_2O_3$), metal-oxide-coated aluminum, and liquid-crystal pigments.

The color-imparting absorption pigments are, for example, customary organic or inorganic absorption pigments which can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

The coating compositions of the invention, accordingly, have the following composition:
- at least one silylated amino resin of the invention, preferably a melamine-formaldehyde resin,
- optionally, at least either a strong or a weak acid,
- optionally, at least one binder,
- optionally, at least one typical coatings additive,
- optionally, at least one solvent, and
- optionally, at least one pigment.

The substrates are coated with the coating compositions of the invention in accordance with conventional techniques which are known to the skilled worker, and which involve applying at least one coating composition or formulation of the invention to the target substrate in the desired thickness, and removing the volatile constituents of the coating composition, with heating if desired (drying). This operation may if desired be repeated one or more times. Application to the substrate may be made in a known way, as for example by spraying, troweling, knife coating, brushing, rolling, roller-coating or pouring. The coating thickness is generally in a range from about 3 to 1000 $g/m^2$ and preferably 10 to 200 $g/m^2$.

Curing may then be carried out as described above.

Examples of suitable substrates for the coating compositions of the invention include thermoplastic polymers, particularly polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyether imides, polyether ketones, polyphenylene sulfides, polyphenylene ethers or mixtures thereof.

Mention may further be made of polyethylene, polypropylene, polystyrene, polybutadiene, polyesters, polyamides, polyethers, polycarbonate, polyvinylacetal, polyacrylonitrile, polyacetal, polyvinyl alcohol, polyvinyl acetate, phenolic resins, urea resins, melamine resins, alkyd resins, epoxy resins or polyurethanes, block or graft copolymers thereof, and blends of these.

Mention may preferably be made of ABS, AES, AMMA, ASA, EP, EPS, EVA, EVAL, HDPE, LDPE, MABS, MBS, MF, PA, PA6, PA66, PAN, PB, PBT, PBTP, PC, PE, PEC, PEEK, PEI, PEK, PEP, PES, PET, PETP, PF, PI, PIB, PMMA, POM, PP, PPS, PS, PSU, PUR, PVAC, PVAL, PVC, PVDC, PVP, SAN, SB, SMS, UF, UP plastics (abbreviated names in accordance with DIN 7728), and aliphatic polyketones.

Particularly preferred substrates are polyolefins, such as PP (polypropylene), which optionally may be isotactic, syndiotactic or atactic and optionally may be unoriented or may have been oriented by uniaxial or biaxial stretching, SAN (styrene-acrylonitrile copolymers), PC (polycarbonates), PVC (polyvinyl chlorides), PMMA (polymethyl methacrylates), PBT (poly(butylene terephthalate)s), PA (polyamides), ASA (acrylonitrile-styrene-acrylate copolymers) and ABS (acrylonitrile-butadiene-styrene copolymers), and also their physical mixtures (blends). Particular preference is given to PP, SAN, ABS, ASA and also blends of ABS or ASA with PA or PBT or PC. Very particular preference is given to polyolefins, PMMA, and PVC.

ASA is especially preferred, particularly in accordance with DE 196 51 350, and the ASA/PC blend. Preference is likewise given to polymethyl methacrylate (PMMA) or impact-modified PMMA.

A further-preferred substrate for coating with the coating compositions of the invention are metals, which, if desired, may have been pretreated with a primer.

As far as the type of metal is concerned, suitable metals may in principle be any desired metals. In particular, however, they are metals or alloys of the kind customarily employed as metallic materials of construction, requiring protection against corrosion.

The surfaces in question are in particular those of iron, steel, Zn, Zn alloys, Al or Al alloys. These are the surfaces of elements composed entirely of the metals or alloys in question. Alternatively, the elements may have been only coated with these metals and may themselves be composed of materials of other kinds, such as other metals, alloys, polymers or composite materials. They may be the surfaces of castings made from galvanized iron or steel. In one preferred embodiment of the present invention the surfaces are steel surfaces.

Zn alloys or Al alloys are known to the skilled worker. The skilled worker selects the nature and amount of alloying constituents in accordance with the desired end-use application. Typical constituents of zinc alloys comprise, in particular, Al, Pb, Si, Mg, Sn, Cu or Cd. Typical constituents of aluminum alloys comprise, in particular, Mg, Mn, Si, Zn, Cr, Zr, Cu or Ti. The alloys may also be Al/Zn alloys in which Al and Zn are present in an approximately equal amount. Steel coated with alloys of these kinds is available commercially. The steel may comprise the customary alloying components known to the skilled worker.

Also conceivable is the use of the coating compositions of the invention for treating tin-plated iron/steel (tinplate).

The coating compositions and formulations of the invention are additionally suitable for coating substrates such as wood, paper, textile, leather, nonwoven, plastics surfaces, glass, ceramic, mineral building materials, such as cement moldings and fiber-cement slabs, or coated or uncoated metals, preferably plastics or metals, particularly in the form of sheets, more preferably metals.

The amino resins, coating compositions or coating formulations of the invention are suitable as or in exterior coatings, i.e., applications where they are exposed to daylight, preferably parts of buildings, interior coatings, and coatings on vehicles and aircraft. In particular the amino resins and coating compositions of the invention are used as or in automotive clearcoat and topcoat material(s). Further preferred applications are in can coating and coil coating.

They are particularly suitable for use as primers, surfacers, pigmented topcoat materials, and clearcoat materials in the segments of industrial, wood, automotive, especially OEM, finishing, or decorative coating. The coating compositions are especially suitable for applications where there is a need for particularly high application reliability, external weathering resistance, optical qualities, solvent resistance and/or chemical resistance.

The examples which follow are intended to illustrate the properties of the invention but without restricting it.

EXAMPLES

Parts in this text, unless indicated otherwise, are by weight.

Example 1

A glass reactor was charged with 74.4 g of allyl alcohol together with 300 mg of para-toluenesulfonic acid monohydrate, and this initial charge was heated to 80-90° C. A solution of 50 g of Luwipal® 066 LF from BASF SE, Ludwigshafen, in 37 ml of xylene was slowly added dropwise, and the methanol liberated was removed from the reaction mixture continuously by distillation. When the calculated amount of methanol had been separated off, the major fraction of the excess allyl alcohol was removed at 50° C. under reduced pressure (50-90 mbar). Remaining traces of allyl alcohol were removed at 0.2 mbar and at room temperature. The resulting product, which had on average about five allyl ether groups per melamine nucleus, was used without further purification in the following synthesis.

Under nitrogen as inert gas, 12 g of the resulting product were charged to a glass reactor, together with 18.9 g of triethoxysilane, and dissolved in 40 ml of absolute toluene. With vigorous stirring, 400 µl of a solution of Pt-divinyltetramethyldisiloxane (2.1% Pt) in xylene, from ABCR Gelest, were added, and the reaction mixture was heated to 60° C. After 2 hours, the solvents were distilled off under reduced pressure at 50° C.

This gave a colorless to pale yellowish resin having a viscosity at room temperature of: 1.45 Pas
Color numbers: 241 Hazen; 2.4 iodine

Example 2

A glass reactor was charged with 109 g of allyl alcohol together with 1.47 g of para-toluenesulfonic acid monohydrate, and this initial charge was heated to 80-90° C. A solution of 245 g of Luwipal® 066 LF from BASF SE, Ludwigshafen, in 100 ml of xylene was slowly added dropwise, and the methanol liberated was removed from the reaction mixture continuously by distillation. When the calculated amount of methanol had been separated off, the major fraction of the excess allyl alcohol was removed at 50° C. under reduced pressure (50-90 mbar). Remaining traces of allyl alcohol were removed at 0.2 mbar and at room temperature. The resulting product was used without further purification in the following synthesis.

Under nitrogen as inert gas, 12 g of the resulting product were charged to a glass reactor, together with 11.3 g of triethoxysilane, and dissolved in 40 ml of absolute toluene. With vigorous stirring, 400 µl of a solution of Pt-divinyltetramethyldisiloxane (2.1% Pt) in xylene, from ABCR Gelest, were added, and the reaction mixture was heated to 60° C. After 2 hours, the solvents were distilled off under reduced pressure at 50° C.

This gave a colorless to pale yellowish resin having a viscosity at room temperature of: 9.2 Pas
Color number: 270 Hazen

Example 3

A glass reactor was charged with 109 g of allyl alcohol together with 1.47 g of para-toluenesulfonic acid monohydrate, and this initial charge was heated to 80-90° C. A solution of 245 g of Luwipal® 066 LF from BASF SE, Ludwigshafen, in 100 ml of xylene was slowly added dropwise, and the methanol liberated was removed from the reaction mixture continuously by distillation. When the calculated amount of methanol had been separated off, the major fraction of the excess allyl alcohol was removed at 50° C. under reduced pressure (50-90 mbar). Remaining traces of allyl alcohol were removed at 0.2 mbar and at room temperature. The resulting product was used without further purification in the following synthesis.

Under nitrogen as inert gas, 12 g of the resulting product were charged to a glass reactor, together with 15.3 g of bis(trimethylsiloxy)methylsilane, and dissolved in 40 ml of absolute toluene. With vigorous stirring, 400 µl of a solution of Pt-divinyltetramethyldisiloxane (2.1% Pt) in xylene, from ABCR Gelest, were added, and the reaction mixture was heated to 60° C. After 2 hours, the solvents were distilled off under reduced pressure at 50° C.

This gave a colorless to pale yellowish resin having a viscosity at room temperature of: 0.7 Pas
Color number: 472 Hazen (DIN EN 1557)

The Luwipal® 066LF used, from BASF SE, is a highly to fully methyl-etherified melamine-formaldehyde resin having a nonvolatiles fraction (as per ISO 3251, 2 g sample with 2 ml of butanol is heated at 125° C. for 2 hours) of 93-96% by weight, with a low free formaldehyde content of not more than 0.3% by weight. The viscosity (ISO 3219 B) is 2.0-6.0 Pas at 23° C. and a shear rate D of 41.3 s$^{-1}$.

Application Examples

The following formulations were prepared, and the coating materials obtained from them were characterized for their gloss and gloss retention by the Crockmeter test.

The Crockmeter test was carried out in accordance with EN ISO 105-X12:2001. 10 back-and-forth strokes 5 cm long ("double rubs") were performed, using 9 µm sandpaper from 3M and an applied pressure of 9N, and the gloss before and after exposure was measured at 20° transversely to the scratch direction. The residual gloss is reported as the percentage fraction, based on the initial gloss.

Further to the constituents listed in table 1, each formulation contains 1 ml of Solvesso/n-butanol (21:9) and 80 mg of p-toluenesulfonic acid monohydrate in solution in 0.3 ml of Solvesso/n-butanol (21:9).

| Sample | Component 1 | Amount [g] | Component 2 | Amount [g] | Component 3 | Amount [g] | Initial gloss | Residual gloss [%] |
|---|---|---|---|---|---|---|---|---|
| 1 | Joncryl® 945 | 2 | Luwipal® 066 | 1 | — | — | 87.7 | 68.8 |

-continued

| Sample | Component 1 | Amount [g] | Component 2 | Amount [g] | Component 3 | Amount [g] | Initial gloss | Residual gloss [%] |
|---|---|---|---|---|---|---|---|---|
| 2 | Joncryl® 945 | 2 | Luwipal® 066 | 0.9 | Example 3 | 0.1 | 85.6 | 79.2 |
| 3 | Joncryl® 945 | 2 | Luwipal® 066 | 0.8 | Example 3 | 0.2 | 84.5 | 86.9 |
| 4 | Joncryl® 945 | 2 | Luwipal® 066 | 0.7 | Example 3 | 0.3 | 89.5 | 87.2 |
| 5 | Joncryl® 500 | 2 | Luwipal® 066 | 1 | — | — | 92.4 | 91.4 |
| 6 | Joncryl® 500 | 2 | Luwipal® 066 | 0.8 | Example 3 | 0.2 | 98.4 | 89.4 |
| 7 | Joncryl® 500 | 2 | Luwipal® 066 | 0.8 | Example 2 | 0.2 | 96.4 | 89.5 |
| 8 | Joncryl® 922 | 2 | Luwipal® 066 | 1 | — | — | 72.7 | 74.4 |
| 9 | Joncryl® 922 | 2 | Luwipal® 066 | 0.8 | Example 3 | 0.2 | 90.2 | 88.2 |

The Joncryl® products 945, 500, and 922 are polyacrylate polyols having different hydroxyl numbers:

Joncryl® 945 possesses an OH number of 140 mg/KOH/g and a glass transition temperature of 17° C., Joncryl® 922 an OH number of 140 mg/KOH/g and a glass transition temperature of −7° C., and.

It is seen that, for samples 1 to 4, with a comparable initial gloss, the residual gloss obtained is improved in the case of the samples according to the invention, or, with an improved initial gloss (samples 5 to 7), a comparable residual gloss is obtained.

In the case of sample 9, both initial gloss and residual gloss are improved relative to the comparison sample, sample 8.

Example 4

In a glass reactor, 3.12 g of Luwipal 066 LF, 6.92 g of 1,4-pentadien-3-ol, 10 mg of p-toluenesulfonic acid, and 10 ml of toluene (anhydrous) were heated under nitrogen to 110° C. When the calculated amount of methanol had been separated off, the reaction mixture was cooled, filtered through silica gel, and eluted with acetone (20 ml). Removal of the organic solvents under reduced pressure gave the product, which was used in the following stage:

In a Schlenk flask, under nitrogen, 7.45 g of the product obtained from the first stage, in 20 ml of toluene (anhydrous), were introduced, and 22.64 g of triethoxysilane and then 0.1 ml of Pt-divinyltetramethyldisiloxane (2.1% Pt) in xylene from ABCR Gelest were added dropwise at room temperature. The mixture was heated at 60° C. for 3 hours. After cooling, the mixture was filtered through silica gel and eluted with acetone (20 ml). The volatile constituents were removed by distillation on a rotary evaporator (max. 50° C.), and drying under a high vacuum gave the product, which is depicted below in an idealized form.

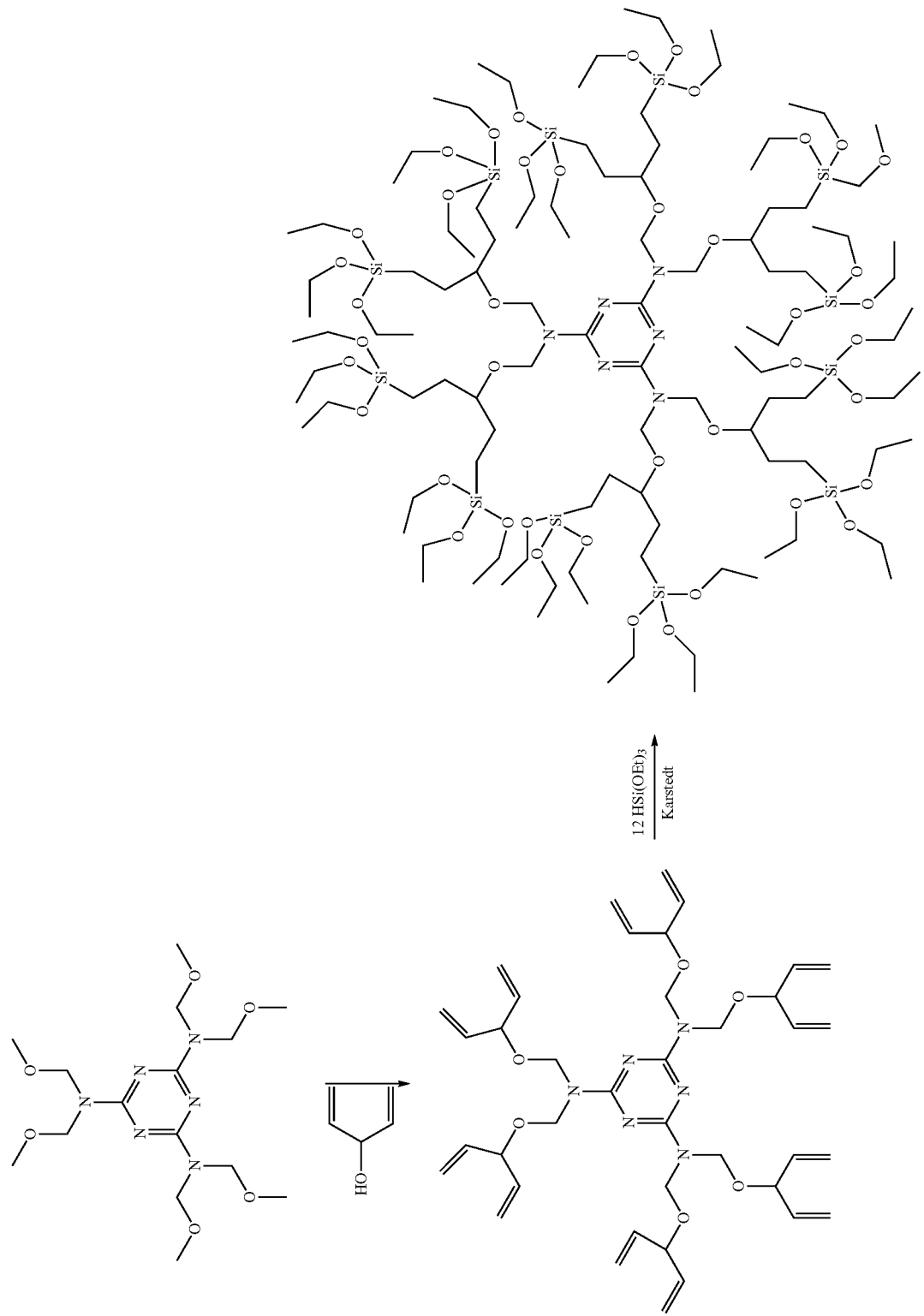

Example 5

Under nitrogen, 5.0 g of the product obtained from the first stage in example 1, in 15 ml of toluene (anhydrous), were introduced, and 516.3 mg of 1,1,3,3-tetramethyldisiloxane and 0.04 ml of Pt-divinyltetramethyldisiloxane (2.1% Pt) in xylene from ABCR Gelest were added dropwise at room temperature. The mixture was heated at 60° C. for 3 hours. After cooling, the mixture is filtered through silica gel and eluted with acetone (10 ml). The volatile constituents were removed by distillation on a rotary evaporator (max. 50° C.), and drying under a high vacuum gave the product, which was used in the subsequent stage.

Under nitrogen, 3.96 g of the resultant product, in 10 ml of toluene (anhydrous), were introduced, and 5.54 g of HSi(OEt)$_3$ and 0.06 ml of Pt-divinyltetramethyldisiloxane (2.1% Pt) in xylene from ABCR Gelest were added dropwise at room temperature. The mixture was heated at 60° C. for 3 hours. After cooling, the mixture was filtered through silica gel and eluted with acetone (10 ml). The volatile constituents were removed by distillation on a rotary evaporator (max. 50° C.), and drying under a high vacuum gives the product, which is shown below in an idealized form.

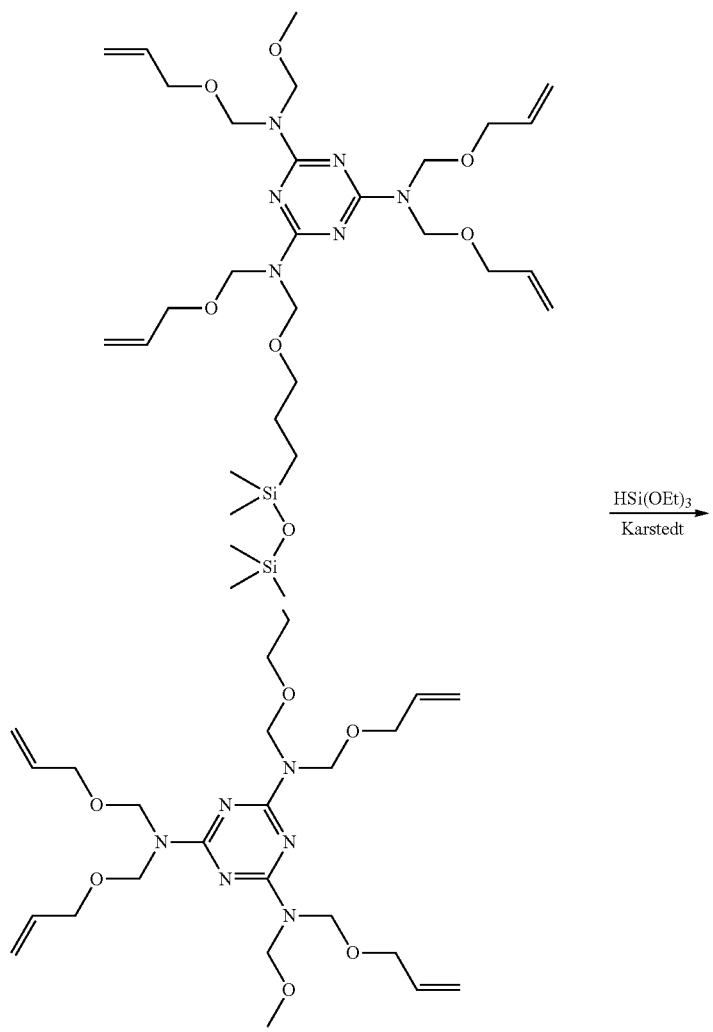 [SMILES: C=CCOCN(COC)c1nc(N(COCC=C)COCC=C)nc(N(COCC=C)COCCC[Si](C)(C)O[Si](C)(C)CCOCN(COCC=C)c2nc(N(COC)COCC=C)nc(N(COCC=C)COCC=C)n2)n1 ; "HSi(OEt)3"]

-continued

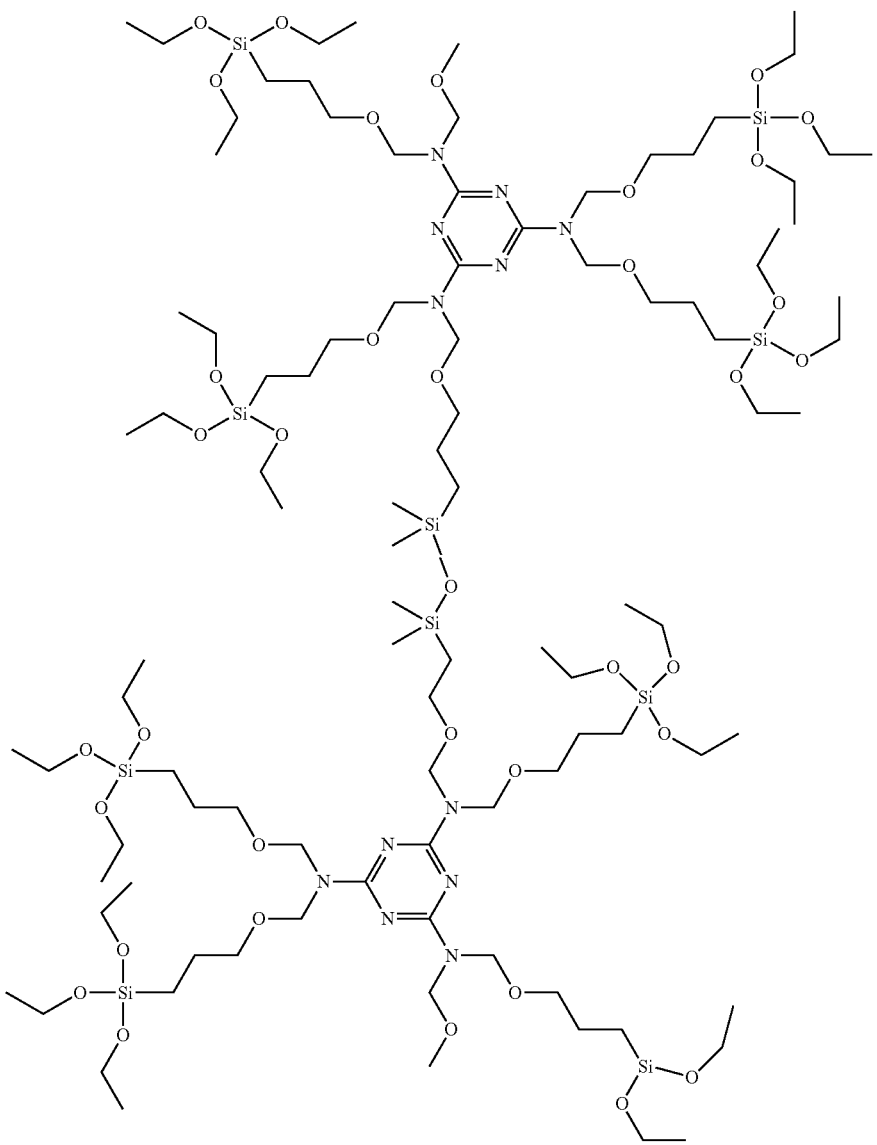

Example 6

In a glass reactor, 80.51 g of cinnamyl alcohol, 234 mg of p-toluenesulfonic acid were heated to 95° C. under nitrogen. 39.04 g of Luwipal 066 LF in 250 ml of toluene (anhydrous) were added. After 6 hours, 21 ml of methanol had been separated off. After cooling, the solvent was removed on a rotary evaporator. The degree of substitution according to 1H-NMR analysis is 4.2.

Under nitrogen, 10 g of the resultant product with approximately 4.2-fold substitution by cinnamyl alcohol, in 200 ml of toluene (anhydrous), were introduced, and 76 g of triethoxysilane and 6 ml of Pt-divinyltetramethyldisiloxane (2.1% Pt) in xylene from ABCR Gelest were added dropwise at 55-60° C. over 30 minutes. The mixture was heated at 64.5° C. for 3 hours. After cooling, the mixture was concentrated on a rotary evaporator (40° C.). This gave, according to 1H-NMR analysis, the product substituted with cinnamyl alcohol and silylated to an extent of about 10%.

Example 7

In 2000 ml of toluene (anhydrous), 500 g of a product analogous to that of example 2 and containing on average approximately four allyl ether groups per melamine nucleus, 469.7 g of allyl alcohol, and 2.50 g of p-toluenesulfonic acid hydrate were introduced. The mixture was heated to 90-96° C. and the degree of substitution was determined by $^1$H-NMR analysis after 6 hours at 5.9. After cooling, the mixture was concentrated on a rotary evaporator (40° C.). This gives 502 g of the desired product.

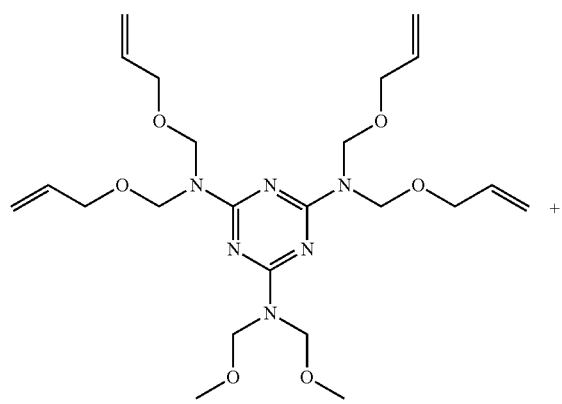

Molecular Weight = 494.60
Molecular Formula = C23H38N6O6

2 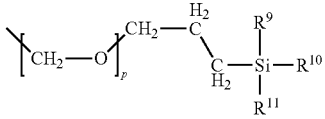

Molecular Weight = 58.08
Molecular Formula = C3H6O

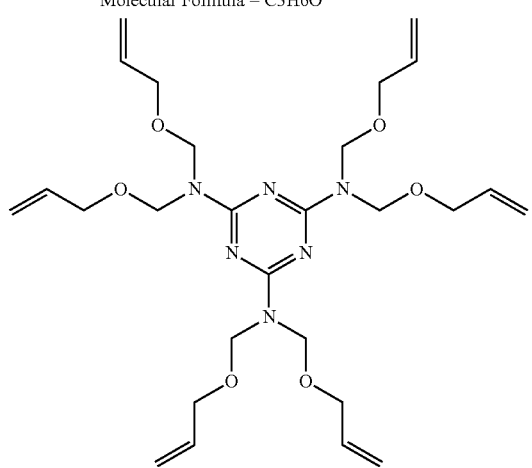

Molecular Weight = 546.67
Molecular Formula = C27H42N6O6

The invention claimed is:

1. A silylated melamine-formaldehyde resin of the formula (I)

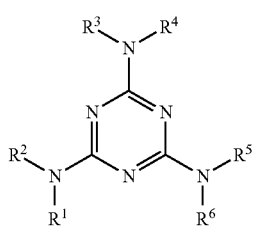

in which radicals $R^1$ to $R^6$ in each case independently of one another may be a) a hydrogen atom (—H) as a radical,
b) —[—CH$_2$—O—]$_m$—H, in which m is a positive integer of at least 1,
c) —[—CH$_2$—O—]$_n$—R$^7$, in which n is a positive integer of at least 1 and $R^7$ is an alkyl radical,
d) a radical of the formula (II)

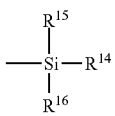

in which p is a positive integer of at least 1,
$R^9$ to $R^{11}$ may independently of one another be
   an alkyl radical or
   a radical —O—R$^{12}$,
in which $R^{12}$ is an alkyl or aryl radical
a radical of the formula (IIIa)

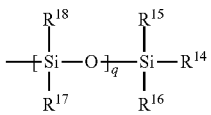

or
a radical of the formula (IIIb)

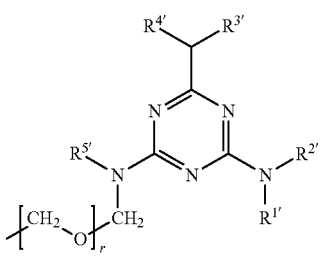

in which $R^{14}$ to $R^{18}$ independently of one another may be alkyl, aryl, alkyloxy, aryloxy, cycloalkyl, and cycloalkyloxy, and q is a positive integer of at least 1, e) a radical of the formula (IV)

in which r may be zero or a positive integer of at least 1 and the radicals $R^{1'}$ to $R^{5'}$ may in each case independently of one another be selected from the groups a) to d),
with the proviso that at least one of the radicals $R^1$ to $R^6$ and $R^{1'}$ to $R^{5'}$ where present, is a radical of the formula (II), and not more than two radicals $R^1$ to $R^6$ in each case are a radical of the formula (IV).

2. A coating composition comprising at least one silylated amino resin according to claim 1.

3. The coating composition according to claim 2, further comprising a binder.

4. The coating composition according to claim 3, wherein said binder is at least one binder selected from the group consisting of polyetherols, polyesterols, polyacrylate polyols, polycarbonate polyols, alkyd resins, and epoxy resins.

5. The coating composition according to claim 2, further comprising a at least either a strong or a weak acid.

6. The coating composition according to claim 2, further comprising a at least one solvent.

7. The coating composition according to claim 2, further comprising at least one pigment.

8. A method for coating a substrate comprising applying to a substrate, the coating composition of claim 2.

9. The method according to claim 8, wherein said substrate is selected from the group consisting of wood, paper, textile, leather, nonwoven, plastics surfaces, glass, ceramic, mineral building materials, uncoated metals and coated metals.

10. The method according to claim 8, wherein said coating is at least one coating selected from the group consisting of a primer, a surfacer, a pigmented topcoat, a clearcoat, an industrial coating, a wood coating, an automotive coating, an OEM coating and a decorative coating.

* * * * *